United States Patent
Beymore

(10) Patent No.: US 10,147,043 B2
(45) Date of Patent: Dec. 4, 2018

(54) SYSTEMS AND METHODS FOR TEXTURE ASSESSMENT OF A COATING FORMULATION

(71) Applicant: PPG Industries Ohio, Inc., Cleveland, OH (US)

(72) Inventor: Paul M. Beymore, Vermilion, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 517 days.

(21) Appl. No.: 13/835,675

(22) Filed: Mar. 15, 2013

(65) Prior Publication Data

US 2014/0278254 A1 Sep. 18, 2014

(51) Int. Cl.
*G06N 7/00* (2006.01)
*G01J 3/46* (2006.01)
*G06T 7/41* (2017.01)

(52) U.S. Cl.
CPC ............ *G06N 7/005* (2013.01); *G01J 3/463* (2013.01); *G06T 7/41* (2017.01); *G06T 2207/10024* (2013.01); *G06T 2207/20076* (2013.01); *G06T 2207/30108* (2013.01)

(58) Field of Classification Search
CPC ........ G01B 21/30; G06N 7/005; G06N 5/006; G01J 3/463; G06T 7/401; G06T 2207/30108; G06T 2207/10024; G06T 2207/20076
USPC .................................................. 702/189, 22
See application file for complete search history.

(56) References Cited

U.S. PATENT DOCUMENTS

| | | | |
|---|---|---|---|
| 3,927,944 A | 12/1975 | Iwahashi |
| 3,972,617 A | 8/1976 | Shibata |
| 4,092,069 A | 5/1978 | Fukuda |
| 4,164,374 A | 8/1979 | Lambe |
| 4,344,142 A | 8/1982 | Diehr, II |
| 4,479,718 A | 10/1984 | Alman |
| 4,544,424 A | 10/1985 | Take |
| 4,711,580 A | 12/1987 | Venable |
| 5,231,472 A | 7/1993 | Marcus |
| 5,319,437 A | 6/1994 | Van Aken |
| 5,590,251 A | 12/1996 | Takagi |
| 5,612,928 A | 3/1997 | Haley et al. |
| 5,926,262 A | 7/1999 | Jung |
| 6,056,821 A | 5/2000 | Nihongi |
| 6,166,841 A | 12/2000 | Pringle |
| 6,249,751 B1 | 6/2001 | Asaba et al. |

(Continued)

FOREIGN PATENT DOCUMENTS

| | | |
|---|---|---|
| CN | 1635957 | 7/2005 |
| CN | 1797420 | 7/2006 |

(Continued)

OTHER PUBLICATIONS

Ingmar Lissner and Philipp Urban, Upgrading color-difference formulas, J. Opt. Soc. Am. A/vol. 27, pp. 1620-1629.*

(Continued)

*Primary Examiner* — Eman Alkafawi
(74) *Attorney, Agent, or Firm* — Workman Nydegger

(57) ABSTRACT

A computer implemented method. The method includes identifying, using a processor, a texture in a target coating, wherein identifying comprises applying a Bayesian process, and assigning, using the processor, a texture value adapted for use by one of a search engine and a formulation engine.

25 Claims, 5 Drawing Sheets

(56) References Cited

U.S. PATENT DOCUMENTS

| | | | |
|---|---|---|---|
| 6,449,384 B2 | 9/2002 | Laumeyer et al. | |
| 6,539,325 B1 | 3/2003 | Numata | |
| 6,794,669 B2 | 9/2004 | Chelvayohan et al. | |
| 7,809,155 B2 | 10/2010 | Nestares et al. | |
| 7,944,561 B2 | 5/2011 | Nisper et al. | |
| 8,345,252 B2 | 1/2013 | Nisper et al. | |
| 8,606,731 B2 | 12/2013 | Fujieda et al. | |
| 8,879,066 B2 | 11/2014 | Norris | |
| 9,482,657 B2 | 11/2016 | Bell | |
| 2003/0208345 A1* | 11/2003 | O'Neill | G01J 3/46 703/6 |
| 2005/0128484 A1 | 6/2005 | Rodrigues | |
| 2005/0169518 A1 | 8/2005 | Boston et al. | |
| 2005/0206383 A1 | 9/2005 | Park | |
| 2006/0030060 A1 | 2/2006 | Noguchi et al. | |
| 2006/0045831 A1 | 3/2006 | Galembeck | |
| 2006/0245632 A1 | 11/2006 | Nisper et al. | |
| 2007/0019887 A1 | 1/2007 | Nestares et al. | |
| 2007/0172113 A1 | 7/2007 | Sai et al. | |
| 2007/0200337 A1 | 8/2007 | Johnson et al. | |
| 2007/0226158 A1 | 9/2007 | Woronow et al. | |
| 2007/0250273 A1* | 10/2007 | De Haas | G01J 3/46 702/22 |
| 2008/0177586 A1 | 7/2008 | Jamjoom | |
| 2008/0235224 A1 | 9/2008 | Rodrigues | |
| 2008/0278723 A1 | 11/2008 | Merchak | |
| 2009/0015835 A1 | 1/2009 | Balakrishnen et al. | |
| 2009/0157212 A1* | 6/2009 | McClanahan | G01J 3/463 700/107 |
| 2009/0190839 A1 | 7/2009 | Higgins | |
| 2009/0213120 A1 | 8/2009 | Nisper et al. | |
| 2009/0292520 A1 | 11/2009 | Nwankpa | |
| 2010/0048242 A1* | 2/2010 | Rhoads | G06F 17/30244 455/556.1 |
| 2010/0228511 A1 | 9/2010 | Chin et al. | |
| 2011/0242562 A1 | 10/2011 | Vrhel | |
| 2011/0282613 A1 | 11/2011 | Skinner | |
| 2012/0225190 A1 | 9/2012 | Steenhoek | |
| 2012/0243797 A1 | 9/2012 | Di Venuto Dayer et al. | |
| 2012/0303376 A1 | 11/2012 | Shishido | |
| 2013/0244197 A1* | 9/2013 | Tjioe | G01J 3/0264 433/29 |
| 2014/0078293 A1 | 3/2014 | Beymore | |
| 2014/0118936 A1 | 5/2014 | Merlet et al. | |
| 2014/0242271 A1 | 8/2014 | Prakash et al. | |
| 2014/0250109 A1* | 9/2014 | Wang | G06F 17/30247 707/723 |
| 2014/0278251 A1 | 9/2014 | Norris | |
| 2014/0278253 A1 | 9/2014 | Beymore | |
| 2014/0278254 A1 | 9/2014 | Beymore | |
| 2015/0023054 A1 | 1/2015 | Goda | |
| 2015/0127269 A1 | 5/2015 | Bell | |
| 2015/0134269 A1 | 5/2015 | Norris | |
| 2015/0134299 A1 | 5/2015 | Norris | |
| 2015/0134300 A1 | 5/2015 | Norris | |

FOREIGN PATENT DOCUMENTS

| | | |
|---|---|---|
| CN | 101184986 | 5/2008 |
| CN | 101646929 | 2/2010 |
| CN | 101784871 | 7/2010 |
| CN | 102549545 | 7/2012 |
| JP | 7150081 | 6/1995 |
| JP | 2002236850 | 8/2002 |
| JP | 2006277555 | 10/2006 |
| JP | 2007218895 | 8/2007 |
| JP | 2010242018 | 10/2010 |
| KR | 20100102147 | 9/2010 |
| TW | 200821602 | 5/2008 |
| TW | 1298466 B | 7/2008 |
| TW | 200834273 | 8/2008 |
| TW | 201339652 | 10/2013 |
| WO | 2003063719 | 8/2003 |
| WO | 2006096521 | 9/2006 |
| WO | 2006/112864 A2 | 10/2006 |
| WO | 2007096402 | 1/2009 |
| WO | 2013049792 | 4/2013 |
| WO | 2013116192 | 8/2013 |
| WO | 2014150337 | 9/2014 |

OTHER PUBLICATIONS

I. Lissner, U. Philipp: "Upgrading Color-Difference Formulas", Journal of the Optical Society of America, vol. 27 No. 7, Jun. 11, 2010 (Jun. 11, 2010), pp. 1620-1629.

D. Puig, M.A. Garcia, J. Melendez: "Application-independent feature selection for texture classification", Pattern Recognition, vol. 43, No. 10, May 10, 2010 (May 10, 2010).

E. Kirchner: Appearance and measurement, modeling and rendering of the visual texture of automotive paints:, Detroit Color Council (DCC), Mar. 13, 2013, XP055153196, Retrieve from the Internet: URL:http://www.detroitcc.org/files2013March14b.pdf Moedels for predicting Texture.

E.J.J.Kirchner, J. Ravi: "Setting tolerances on color and texture for automotive coatings", Color Research & Application, vol. 39, No. 1, Jul. 25, 2012, pp. 88-89, XP05515251.

PPG automotive refinish: "RapidMatch (TM) X-5: quida utente", Pittsburgh Plate Glass (PPG) Industries, 2012, XP055153237, Retrieved from the Internet.

Korean Office Action in application No. 2015-7025121 dated Jan. 31, 2017.

Kuncheva, Ludmila I., James C. Bezdek, and Robert PW Duin. "Decision templates for multiple classfier fusion: an experimental comparison" Pattern recognition 34.2.2001.

Chinese Office Action in application No. 201480015523.1 dated Feb. 7, 2017.

Anonymous, "Chapter 1.3.5.17. Detection of Outliers", NIST/SEMATECH e-Handbook of Statistical Methods, Jan. 1, 2012, XP055162021.

Paravina et al, "Evaluation of blending effect of composites related to restoration size", Dental Materials, Elsevier, Amsterdam, NL, vol. 22, No. 4, Apr. 1, 2006, pp. 299-307, XP027943381, ISSN: 0109-5641 table 2.

Takagi et al, "Prediction of spectral reflectance factor distribution of color-shift paint finishes", Color Research & Application, John Wiley & Sons, Inc., US, vol. 32, No. 5, Oct. 1, 2007, pp. 378-387, XP002604927, ISSN: 0361-2317.

Beymore, Paul M., U.S. Appl. No. 14/121,869, "Pigment Identification of Complex Coating Mixtures with Sparkle Color", filed Oct. 28, 2014.

Non-Final Office Action for U.S. Appl. No. 14/535,399 dated Apr. 4, 2017.

Final Office Action for U.S. Appl. No. 14/535,399 dated Nov. 1, 2017.

Non-Final Office Action in U.S. Appl. No. 14/535,380 dated Apr. 12, 2017.

Office Action in application No. 201480070100.X dated Feb. 27, 2017.

Final Office Action for U.S. Appl. No. 14/535,380 dated Oct. 27, 2017.

Final Office Action for U.S. Appl. No. 14/535,372 dated Oct. 6, 2017.

Non-Final Office Action for U.S. Appl. No. 14/535,372 dated Jun. 20, 2017.

Non-Final Office Action for U.S. Appl. No. 13/832,116 dated Mar. 5, 2014.

Korean Office Action in application No. 201507025129 dated Jun. 21, 2016.

Final Office Action for U.S. Appl. No. 13/832,554 dated Apr. 20, 2016.

Non-Final Office Action for U.S. Appl. No. 13/832,554 dated Sep. 23, 2015.

Kokla, Vassiliki et al., A Bayesian decision model for watercolour analysis, Proc. of SPIE, 2007, vol. 6618, pp. 66180S-1-66180S-9.

Korean Office Action for application No. 2015/7025129 dated Dec. 29, 2016.

(56) References Cited

OTHER PUBLICATIONS

Chinese Office Action for application No. 201480015524.6 dated Dec. 26, 2016.
Final Office Action for U.S. Appl. No. 13/832,554 dated Sep. 6, 2017.
Non-Final Office Action for U.S. Appl. No. 13/832,554 dated May 2, 2017.
*Alice* vs *CLS Bank* (Supreme Court Decision) (2013).
Non-Final Office Action for U.S. Appl. No. 13/832,554 dated Dec. 12, 2017.
Non-Final Office Action for U.S. Appl. No. 14/535,372 dated Feb. 15, 2018.
Li Sun and Richard M. Crooks in Molecular Interactions between Organized, Surface Confided Monolayers and Vapor-Phase Probe Molecules. 5. Acid-Base Interactions, 1993 American Chemical Society, pp. 1775-1780.
Final Office Action for U.S. Appl. No. 13/832,554 dated Mar. 26, 2018.
Massonnet et al., "Identification of organiz pigments in coatings: applications to red automotive topcoats", First Neeting of the European Academy of Forensic Sciences, 1997.
Harkins et al., Identification of pigments in paint products by infrared spectroscopy, Analystical Chemistry, 1959.
Janina et al., "Examination of multilayer paint coats by the use of infrared, Raman and XRF spectroscopy for forensic purposes", J. of Molecular Structure, 2006.
Ralik, "Bulk optical properties of phthalocyanine pigment particles", Can J. Chem, 1980.
Non-Final Office Action for U.S. Appl. No. 14/535,380 dated Apr. 2, 2018.
Wang Qiang, "Texture Analysis and Classification Based on Bayesian Network Model", Computer Aided Design & Computer Graphics, Dec. 31, 2007, pp. 1565-1568.
Non-Final Office Action for U.S. Appl. No. 14/535,372 dated Apr. 26, 2018.
Takuro Yonezawa, "An Event Decription Language Using Temporal Relation for Smart Object Services", IPSJ SIG Technical Report 2008-MBL-44, Mobile computing and ubiquitous communication, 2008-UBI-17, Ubiquitous computing system, Information Processing Society of Japan, Feb. 27, 2008, vol. 2008, No. 18, pp. 75-82.
Japanese Office Action for application No. JP 2016-501119 dated Nov. 7, 2016.

* cited by examiner

SYSTEMS AND METHODS FOR TEXTURE ASSESSMENT OF A COATING FORMULATION

FIELD OF THE INVENTION

In various embodiments, the present invention generally relates to systems and methods for evaluating colorimetric and physical property attributes of coating mixtures in order to provide a texture quality to a user for use in formulating a coating match, in searching for a coating match in data storage (e.g., a database), and in quality assurance.

BACKGROUND OF THE INVENTION

In order to provide a proper color match to a target sample that is coated with a target coating using formulation or search engines (or a visual process), it is desirable to determine the correct pigmentation of the target coating. If the same pigments or appropriate offsets as those in the target coating are utilized, a formulation or search process may arrive at an apparent optimum solution as to the formulation of the target coating. However, a color match may not precisely provide an entirely matched sample if there is a possibility of varying the textural qualities due to pigment textures. Also, excluding those pigments, either deliberately or inadvertently, from availability will result in a less than optimal color match.

Several existing match search or formulation engines and methodologies attempt to encompass pigment selection and formulation via various algorithms. Various pigment identification packages and formulation engines take a "brute" force, guess and check type of approach to provide formulations and pigment information to their users. The combinatorial approach, a brute force method, is a frequently used method in which nearly all available pigments are combined in all combinations available given an end number of pigments desired in the final match. Although there have been some methods which restrict the usage of some pigments given certain conditions to optimize the engine's speed, the end result is that the formula combinations are validated against the sample and a selection of one or more formulas most nearly matching the target coating are provided to the user.

Other solutions require the user to submit a sample set of toners to a search or formulation engine, and still other methods select a predefined subset of toners to use. These methods have been typically burdensome for users and lack proper "intuition" to provide a streamlined method to a good solution for the user. Additionally, by the nature of such methodology, appropriate pigments necessary to match the target coating may be excluded.

Neural networks have been used to select color matches from existing databases of pre-generated possible matches or to act as formulation engines themselves. The strength of a neural network is its ability to address both linear and non-linear relationships, but this strength comes at a cost of bulkiness, inflexibility, and a requirement of significant overhead to meticulously manage a sometimes large learning database and structure. The inflexibility, or rigid operation, of a neural network generally must be used in a feedback design to optimize the node weightings leading to and within the hidden layers of the network. A neural network requires this type of backpropagation of errors acquired from desired outputs in order to "learn." The actual learning, or training, of the neural network is based on the reduction of the calculated error given a desired output by repeated reintroduction of the input and adjustment of the weights based on the prior iteration's error.

As can be seen in FIG. 1, a typical neural network requires a nearly ideally defined input and requires significant effort to update and/or alter the various layers (nodes) if an error needs to be corrected or a new piece of information needs to be considered. Although fewer steps, compared to some prior models, are apparent to the user, a neural network tends to be relatively slow and unidirectional due to its nature of trying to encompass the resolution to a formulation or color search in one massive step. Also, as with the methodologies discussed hereinabove, the exclusion of necessary pigments is a possibility. A neural network also requires precise and somewhat tedious maintenance of the weights, the database, the calculations, the sophisticated and rigid process mapping, and the substantial "training" to be effective.

Thus, there is a need for systems and methods that have flexibility to partition the processing steps into smaller multidirectional pieces and that utilize a feed forward type of design for speed and accuracy. There is also a need for systems and methods that minimize user interaction and create a flexible stepwise methodology of pigment identification and tolerancing in combination with a formulation engine.

SUMMARY OF THE INVENTION

In a first aspect, embodiments of the invention provide a computer implemented method. The method includes identifying, using a processor, a texture in a target coating, wherein identifying comprises applying a Bayesian process, and assigning, using the processor, a texture value adapted for use by one of a search engine and a formulation engine.

In another aspect, embodiments of the invention are directed to a system. The system includes a database and a processor in communication with the database and programmed to: identify a texture in a target coating, wherein identifying comprises applying a Bayesian process, and assign a texture value adapted for use by one of a search engine and a formulation engine.

In another aspect, embodiments of the invention provide an apparatus. The apparatus includes means for identifying a texture in a target coating, wherein identifying comprises applying a Bayesian process, and means for assigning, using the processor, a texture value adapted for use by one of a search engine and a formulation engine.

In a further aspect, embodiments of the invention provide a non-transitory computer readable medium including software for causing a processor to: identify a texture in a target coating, wherein identifying comprises applying a Bayesian process; and assign a texture value adapted for use by one of a search engine and a formulation engine.

DETAILED DESCRIPTION OF THE INVENTION

In various embodiments, the present invention generally relates to systems and methods comprising a Bayesian belief system that may be independent or dependent Bayesian systems and methods. Embodiments include various modules that may be used in combination to identify the texture qualities of a sample that is coated with an unknown target coating. In another aspect, the modules may be used to determine the texture nature of known samples and/or known pigments.

While the description herein generally refers to paint, it should be understood that the devices, systems and methods apply to other types of coatings, including stain and industrial coatings. The described embodiments of the invention should not be considered as limiting. A method consistent with the present invention may be practiced in a variety of fields such as the matching and/or coordination of apparel and fashion products.

Embodiments of the invention may be used with or incorporated in a computer system that may be a standalone unit or include one or more remote terminals or devices in communication with a central computer via a network such as, for example, the Internet or an intranet. As such, the computer or "processor" and related components described herein may be a portion of a local computer system or a remote computer or an on-line system or combinations thereof. The database and software described herein may be stored in computer internal memory or in a non-transitory computer readable medium.

Figure 1:
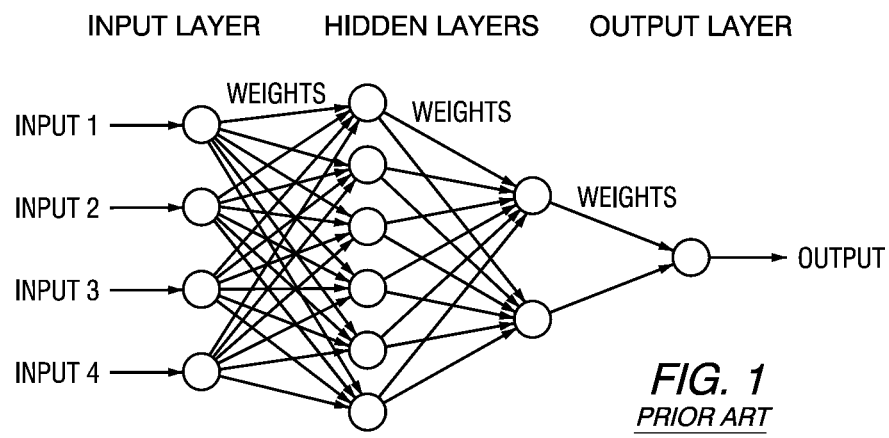
FIG. 1 illustrates a typical neural network.
Figure 2:
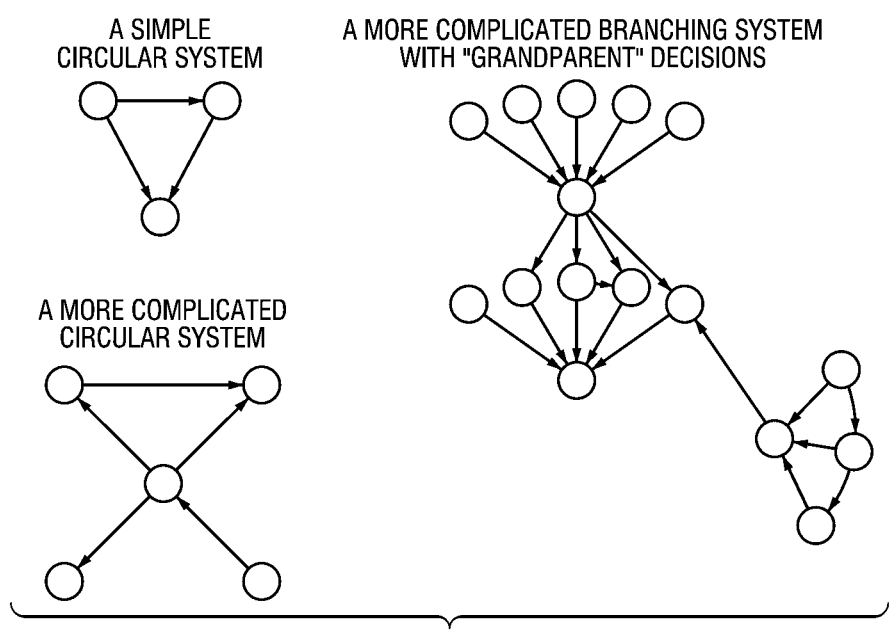
FIG. 2 illustrates examples of typical Bayesian systems.

A Bayesian system is based on probabilistic reasoning from Bayes' Theorem, which is derived from the conditional probability's definition. Examples of Bayesian systems are shown in FIG. 2.

Bayes Theorem  Equation 1

$$P(A|B) = \frac{P(B|A)P(A)}{P(B)}$$

where: $P(B) \neq 0$

By utilizing Bayes theorem a system of dependent and independent decision points may be used to determine the texture nature of an unknown sample.

A basic Bayesian system consisting of multiple decision points may be used to determine the probability (belief) that a given sample has the attributes of a particular texture type. Basic texture types can be divided into multiple qualitative nominal or ordinal categories. By way of example, some categories may be labeled: Very Fine, Fine, Medium, Less Coarse, Coarse. The categories can be further subdivided by, for example, sparkle characteristics such as high, medium, and low. The various decision points within a Bayesian system that may be used to determine the texture of the target coating may comprise, but are not limited to: Colorimetric values (DE, L, a, b, C, h, X, Y, Z), logarithms of colorimetric values, flop indices, similarity indices, travel indices, travel areas, products of reflectance, various angular spectral data, sum of squares DE, and/or combinations thereof.

Figures 3, 4:
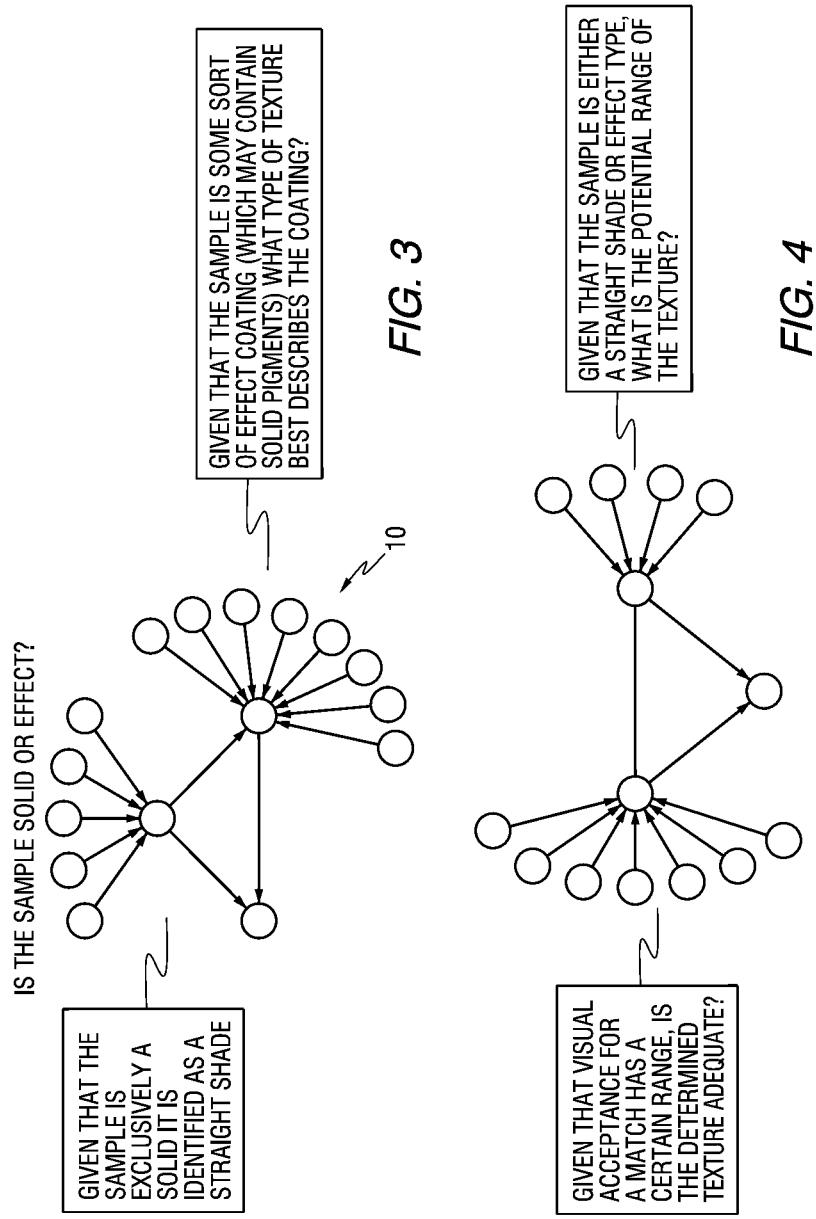
FIG. 3 illustrates a high level representation of a texture scale identification Bayesian module according to various embodiments of the present invention.
FIG. 4 illustrates a high level representation of a tolerance Bayesian module according to various embodiments of the present invention.

A first decision point in various embodiments is determining if the target coating contains effect pigments or if only solid pigments are present. This can be done by utilizing decision points which consider, but are not limited to, Chroma, Lightness, and Hue. Various probabilistic equations can be evaluated given chroma and lightness to determine the probability a sample contains effect pigmentation or contains only straight shade, solid, pigments. If only solid pigments are present, the texture may be due to the substrate and can be adequately mimicked by placing an appropriately matching colored paint over the identical substrate. If an effect pigmentation is present then further evaluation with Bayesian system and method may be necessary to elicit the proper textural information. An example of a high level representation of a texture determining Bayesian module is shown in FIG. 3.

Embodiments of the present invention utilize a five angle spectrophotometer, such as the CM64 produced by X-Rite, Incorporated, to generate a variety of weighted simplified decision points for each angle of data provided from the instrument. For example, the decision points for a sample with a chroma value greater than 10 at the 15° angle should contain a logical set of decisions that include emphasis on color considering values when analyzing that particular angle. However, a sample with a chroma below 10 should emphasize lightness and darkness values. Each set of angular data may be split along these lines for determination of the probability that a sample is of one of the 5 coarseness categories discussed herein. In various embodiments, the sparkle values may be considered in a similar fashion. The combination of the two phenomena results in a texture value which may be summarized by 5 or more (e.g., 15 in background assessments—combination of 3 sparkle and 5 coarseness categories) ranges: from T1-T5 as an example.

By providing the information for consideration in the various decision points, even simple directional spectrophotometers without cameras may be used to provide textural information of a target coating. The information may then be used to further differentiate the quality of a match previously found through consideration of color related criteria. In various embodiments, camera information, color or otherwise, may also be considered as part of an additional group of decision points. These decision points may be, but are not limited to, the following: intensity of sparkle, concentration of sparkle within a given radius, similarity indices, and principle components. Considering these parameters "simultaneously" during decisions in a Bayesian system may allow for a synergistic approach in which the sum of the decisions is greater than the individual pieces. Further, the sparkle and coarseness values may be combined into a single texture parameter. However, in order to simplify the search for a match to a sample from within a dataset, some generalized information regarding texture may in various embodiments be attributed to each match within the dataset, available pigment, or both. The process for assigning texture values to the dataset is described herein. The texture values from previously developed formulations may then be directly compared to those of the target coating to evaluate compatibility of the match. Comparison with individual pigments or groups of individual pigments may require an additional Bayesian module to account for the contribution to texture of each pigment at various concentrations within the formulation. Embodiments of the present invention may be used as an informational decision point within a formulation engine, whether it be for pigment selection or concentration determination.

Depending upon the application, a tolerancing module may be used to determine adequate assignment of texture values. A correlation between the visual acceptable limits may be calculated in which a variety of Bayesian decision points may be connected together. Examples of the decision points may be, but are not limited to, the following: colorimetric values such as L, C, h, Delta E, Similarity Indices of spectral information, multidimensional models of various key combinations of specular information, a compound match rating system, texture evaluation, or a combined angular normalized spectral "curve." A high level representation of a tolerance Bayesian module is illustrated in FIG. 4.

Figure 5:
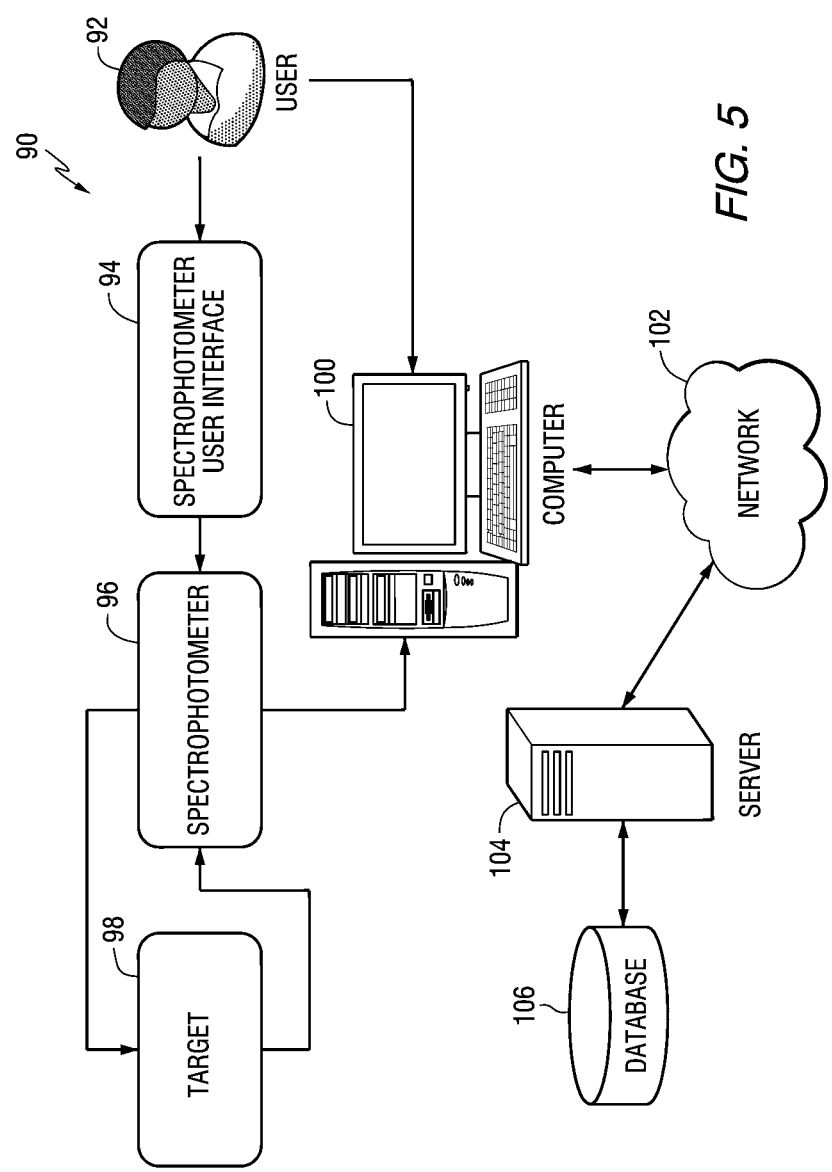
FIG. 5 illustrates an embodiment of a system which may be used to identify physical property attributes of a coating mixture of a target sample.

FIG. 5 illustrates an embodiment of a system 90 which may be used to identify physical property attributes of a coating mixture of a target sample. A user 92 may utilize a user interface 94, such as a graphical user interface, to operate a spectrophotometer 96 to measure the properties of a target sample 98. The data from the spectrophotometer 96 may be transferred to a computer 100, such as a personal computer, a mobile device, or any type of processor. The computer 100 may be in communication, via a network 102, with a server 104. The network 102 may be any type of network, such as the Internet, a local area network, an intranet, or a wireless network. The server 104 is in communication with a database 106 that may store the data and information that is used and generated by the methods of embodiments of the present invention. Various steps of the methods of embodiments of the present invention may be performed by the computer 100 and/or the server 106.

Figure 6:
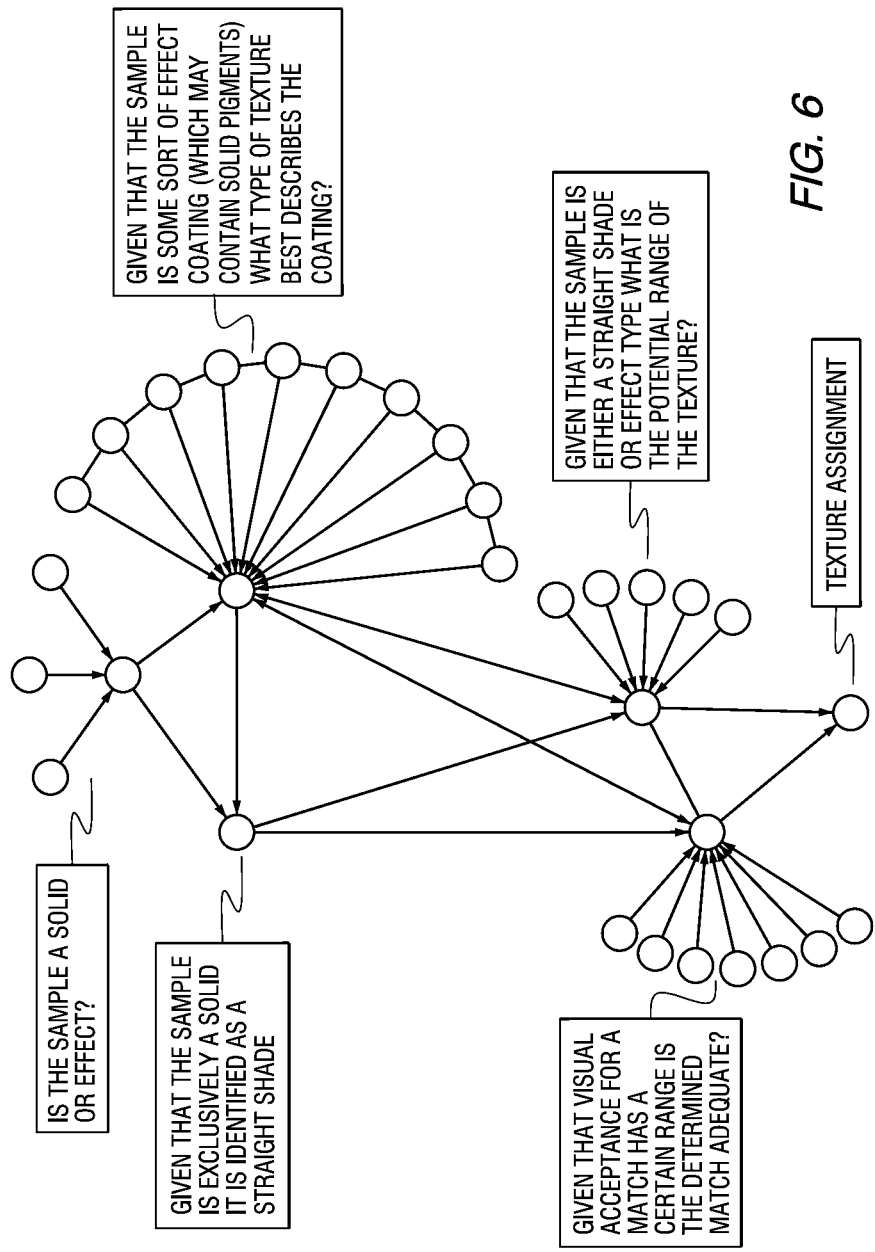
FIG. 6 illustrates a high level representation of a Bayesian system according to various embodiments of the present invention

The combination of a Bayesian texture determining module with a Bayesian tolerancing module may adequately describe the texture of a given target coating and may provide increasingly accurate texture values with increasingly more informative spectrophotometers. However, the texture assessment from even the simplest of units can provide ample information for an adequate texture assignment. An example of a Bayesian system comprising the modules disclosed herein is presented in FIG. 6.

Figure 7:
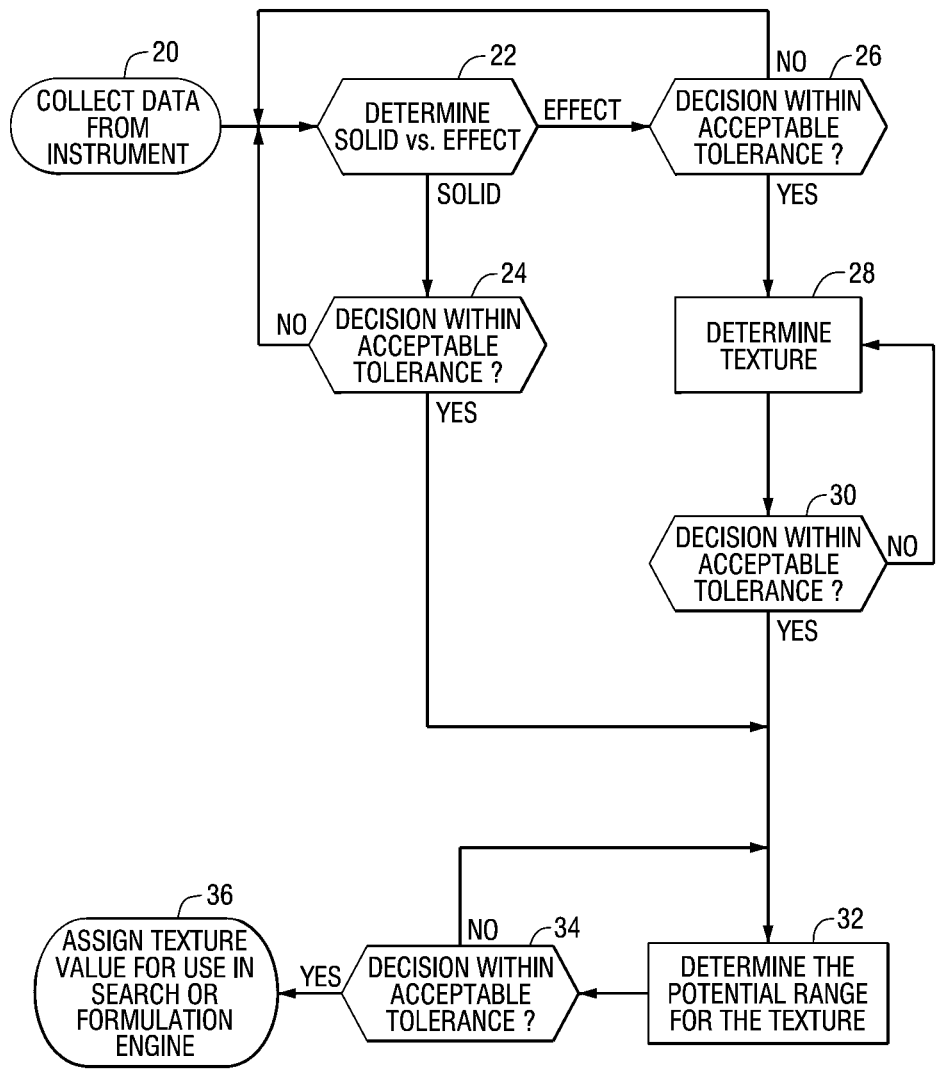
FIG. 7 illustrates an embodiment of a process for identifying physical property attributes of a coating mixture of a target sample.

FIG. 7 illustrates an embodiment of a process for identifying physical property attributes of a coating mixture of a target sample. The process begins at step 20, where data is collected from an instrument (e.g., the spectrophotometer 96). At step 22, the process determines whether a solid or effect is present. If a solid is present, at step 24 the process determines, using the tolerancing module, whether the decision at step 22 is within an acceptable tolerance. If not, the process returns to step 22. If an effect is present as determined at step 22, the process advances to step 26, where the process determines, using the tolerancing module, whether the decision at step 22 is within an acceptable tolerance. If not, the process returns to step 22.

If the decision at step 22 is within an acceptable tolerance as determined at step 26, the process advances to step 28 where the texture scale identification module identifies the texture in the target coating. At step 30, the process determines, using the tolerancing module, whether the texture identification is within an acceptable tolerance. If not, the process returns to step 28. If the texture identification is within an acceptable tolerance, the process advances to step 32 where a potential range for the texture is determined. At step 34, the process determines, using the tolerancing module, whether the texture range is within an acceptable tolerance. If not, the process returns to step 32. If the texture range identification is within an acceptable tolerance, the process advances to step 36 where the texture value is assigned for use in a search or formulation engine.

Although various embodiments have been described herein as having decision points made inside Bayesian systems, it is contemplated that such decisions may be made outside of a Bayesian system.

In another aspect, the invention may be implemented as a non-transitory computer readable medium containing software for causing a computer or computer system to perform the method described above. The software can include various modules that are used to enable a processor and a user interface to perform the methods described herein.

It will be readily appreciated by those skilled in the art that modifications may be made to the invention without departing from the concepts disclosed in the forgoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A computer implemented method for formulating a matching coating for a target sample, comprising:
    generating multiple sets of Bayesian decision points, wherein each set of Bayesian decision points comprises a feed-forward configuration of a plurality of conditional decisions corresponding to a probability that a particular effect pigment is present in a known coating given a presence of one or more reflectance values, the one or more reflectance values comprising at least one chroma value;
    wherein one set of Bayesian decision points based on one chroma value measured at an angle differs from another set of Bayesian decision points based on another chroma value taken at the same angle;
    storing the generated sets of Bayesian decision points for the known coatings;
    receiving, from a spectrophotometer, spectrophotometric information taken at a plurality of different angles of a target coating applied to a target sample;
    calculating, using the spectrophotometric information and without a camera, each of the generated sets of Bayesian decision points simultaneously to determine a probability that the target coating comprises a texture type corresponding to at least one of (i) one of multiple coarseness categories, or (ii) one of multiple sparkle categories; and
    for each target coating, sending the determined texture type and corresponding probability thereof to a formulation engine, wherein the formulation engine compares the calculated texture type and corresponding probability with one or more texture types determined for the plurality of known coatings to determine a probability that the target coating contains one or more effect pigments found in one of the known coatings.

2. The method as recited in claim 1, further comprising determining, for each known coating, and for each target coating, a probability value corresponding to the determined coarseness category.

3. The method as recited in claim 1, further comprising determining, for each known coating, and for each target coating, a probability value corresponding to the determined sparkle category.

4. The method as recited in claim 1, wherein each texture type is characterized by both: (i) at least one of the multiple coarseness categories, and (ii) at least one of the multiple sparkle categories.

5. The method as recited in claim 1, further comprising:
the formulation engine determining a pigment concentration for the target coating based on the determined texture type and corresponding probability thereof.

6. The method as recited in claim 1, wherein:
a first Bayesian decision point comprises a logical set of decisions that emphasize color when the at least one chroma value is greater than a particular value at the angle; and
a second Bayesian decision point comprises a logical set of decisions that emphasize lightness and darkness when the at least one chroma value is less than the particular value at the angle.

7. The method as recited in claim 3, wherein a particular chroma value at a first angle is 10, such that the at least one chroma value that correlates with the another set of Bayesian decision points is less than 10.

8. The method as recited in claim 1, further comprising:
calculating, simultaneously, multiple different sets of Bayesian decision points derived from data taken at multiple angles using the another spectrophotometer of the target coating to determine a probability that the target coating comprises at least one effect pigment.

9. The method as recited in claim 1, further comprising:
calculating the determined sparkle category for the determined texture category of each known and each target sample by calculating each of the following from the corresponding reflectance data:
(i) intensity of sparkle;
(ii) concentration of sparkle within a given radius; and
(iii) similarity indices.

10. The method as recited in claim 1, further comprising:
determining a contribution to texture of one or more individual effect pigments at various concentrations to (i) determine pigment selection, and (ii) pigment concentration in the target coating.

11. A computer system comprising computer-executable instructions stored thereon that, when executed cause one or more processors in the computer system to perform a method for generating a known coating database for use in formulating a matching coating for a target sample, comprising:
measuring a plurality of known coatings at multiple angles with a multi-angle spectrophotometer, each known coating correlating to a texture category based on the presence of one or more effect pigments in the known coatings, wherein the texture categories are characterized by at least one of (i) one of multiple coarseness categories, or (ii) one of multiple sparkle categories;
determining that each of the known coatings comprise one of two categories: (i) coatings that comprise an effect pigment or (ii) coatings that do not comprise an effect pigment;
associating a set of Bayesian decision points with each determined category, wherein the Bayesian decision points comprise a feed-forward configuration of conditional decisions corresponding to a probability that a coating does or does not contain any effect pigment based on reflectance values corresponding at least to Chroma, Lightness, and Hue;
generating, for the known coatings determined to comprise an effect pigment, at least one of (i) a set of multiple coarseness values, or (ii) a set of multiple sparkle values;
receiving spectral data from the multi-angle spectrophotometer for a target sample;
calculating, using the spectral data and without a camera, all of the set of Bayesian decision points with respect to the received spectral data simultaneously to determine that the target sample comprises an effect pigment; and
storing the spectral data, texture category, coarseness value, and sparkle value corresponding to the new known coating in the database.

12. The method as recited in claim 11, further comprising determining, for each known coating, a probability value corresponding to the determined coarseness category.

13. The method as recited in claim 11, further comprising determining, for each known coating, a probability value corresponding to the determined sparkle category.

14. The method as recited in claim 11, wherein each texture category is characterized by both: (i) at least one of the multiple coarseness categories, and (ii) at least one of the multiple sparkle categories.

15. The method as recited in claim 11, wherein:
a first Bayesian decision point comprises a logical set of decisions that emphasize color when the at least one chroma value is greater than 10 at the measured angle; and
a second Bayesian decision point comprises a logical set of decisions that emphasize lightness and darkness when the at least one chroma value is less than 10 at the measured angle.

16. The method as recited in claim 11, further comprising:
calculating the determined sparkle category for the determined texture category of each known coating by calculating each of the following from the corresponding reflectance data:
(iv) intensity of sparkle;
(v) concentration of sparkle within a given radius; and
(vi) similarity indices.

17. The method as recited in claim 11, further comprising:
determining a contribution to texture of one or more individual pigments in each known coating at various concentrations to (i) determine pigment selection and (ii) pigment concentration in the target sample.

18. A computer system comprising computer-executable instructions stored thereon that, when executed cause one or more processors in the computer system to perform a method of matching a target coating to a coating in a known coating database using texture values approximated from spectrophotometric reflectance data, comprising:
collecting at a computer system spectral data from a multi-angle spectrophotometer, the spectral data comprising reflectance data measured at multiple angles of a target coating applied to a physical target sample;
calculating, using the spectral data and without a camera, a plurality of first Bayesian decision points on the spectral data to determine a probability that an effect pigment is present in the target coating;
wherein the plurality of first Bayesian decision points comprise a feed-forward configuration of a plurality of conditional decisions corresponding to a probability that a particular effect pigment is present in the known coating given the presence of one or more reflectance values in the target coating pertaining to Chroma, Lightness, and Hue;

comparing the determined probability of the presence or lack of an effect pigment in the target coating with an expected value taken from a plurality of known coatings that contain one or more effect pigments;

if the determined probability for the target coating is acceptable, the method further comprising:

identifying a texture category for the target coating, wherein identifying the texture category comprises:

calculating a plurality of different Bayesian decision points simultaneously to determine that the target coating correlates with one of multiple different texture categories at a determined probability, wherein each different texture category is characterized by at least one of (i) one of multiple coarseness categories, or (ii) one of multiple sparkle categories determined in the target coating;

determining that the determined texture category and corresponding probability is within a range of expected texture category probabilities identified from the plurality of known coatings;

sending the assigned texture category to a formulation engine, wherein the formulation engine uses the determined texture category and corresponding probability thereof to further determine at least one of (i) select an effect pigment for the target coating, or (ii) a concentration of the effect pigment for the target coating.

19. The method as recited in claim 18, further comprising determining, for each target coating, a probability value corresponding to the determined coarseness category.

20. The method as recited in claim 18, further comprising determining, for each target coating, a probability value corresponding to the determined sparkle category.

21. The method as recited in claim 18, wherein the determined texture category is characterized by both: (i) at least one of the multiple coarseness categories, and (ii) at least one of the multiple sparkle categories.

22. The method as recited in claim 18, further comprising:
sending the determined texture category and corresponding probability thereof to the formulation engine;
wherein the formulation determines a pigment concentration for the target coating based on the determined texture category and corresponding probability thereof.

23. The method as recited in claim 18, further comprising:
identifying the texture category comprises simultaneously calculating at least first and second different sets of Bayesian decision points;
wherein:
the first set of Bayesian decision points comprise a logical set of decisions that emphasize color values at the particular angle; and
the second set of Bayesian decision points comprise a logical set of decisions that emphasize lightness and darkness values at the particular angle.

24. The method as recited in claim 18, further comprising:
calculating the determined sparkle category for the determined texture category of each known and each target sample by calculating each of the following from the corresponding reflectance data:
(vii) intensity of sparkle;
(viii) concentration of sparkle within a given radius; and
(ix) similarity indices.

25. The method as recited in claim 18, further comprising:
determining a contribution to texture of one or more individual effect pigments at various concentrations to (i) determine pigment selection, and (ii) pigment concentration in the target coating.

* * * * *